United States Patent [19]

Goellner

[11] Patent Number: 4,507,521

[45] Date of Patent: Mar. 26, 1985

[54] HIGH PRESSURE ELECTRICAL CONDUCTIVITY PROBE

[75] Inventor: Allan R. Goellner, Parma Heights, Ohio

[73] Assignee: The Clark-Reliance Corp., Cleveland, Ohio

[21] Appl. No.: 427,490

[22] Filed: Sep. 29, 1982

[51] Int. Cl.³ ............................................. H01B 17/30
[52] U.S. Cl. ................................. 174/151; 73/304 R; 324/448
[58] Field of Search ...................... 174/18, 151, 152 R; 73/304 R, 304 C; 324/446, 448, 449; 340/620; 361/284

[56] References Cited

U.S. PATENT DOCUMENTS

| | | | |
|---|---|---|---|
| 2,525,754 | 10/1950 | Albrecht | 324/448 |
| 3,018,322 | 1/1962 | Goellner | 174/151 |
| 3,158,682 | 11/1964 | Goellner | 174/151 |
| 3,226,474 | 12/1965 | Garnett et al. | 174/151 |
| 3,843,832 | 10/1974 | Petersen et al. | 174/151 |

FOREIGN PATENT DOCUMENTS 327597 4/1930 United Kingdom ................ 340/620

OTHER PUBLICATIONS

Clark-Reliance brochure entitled "Electro Eye-Hye System", Section C7, 4 pages.

Primary Examiner—Laramie E. Askin
Attorney, Agent, or Firm—Yount & Tarolli

[57] ABSTRACT

A high pressure electrical conductivity probe generally used as a liquid level indicator having a high pressure mechanical seal between an insulator and a metal mounting body and an electrode connector. The high pressure mechanical seal is effected using a cylindrical insulator with planar end faces which are located in and sheathed in cylindrical recesses in the metal mounting body and the electrode connector. Preferred sealing means include flexible expanded graphite gaskets or a mechanical interference fit.

12 Claims, 4 Drawing Figures

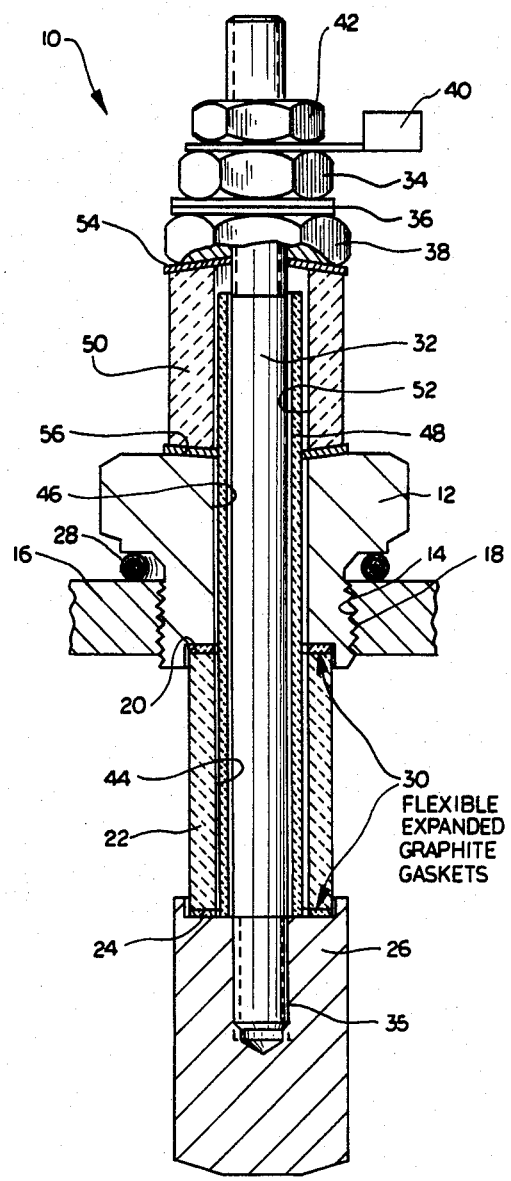
FIG. I
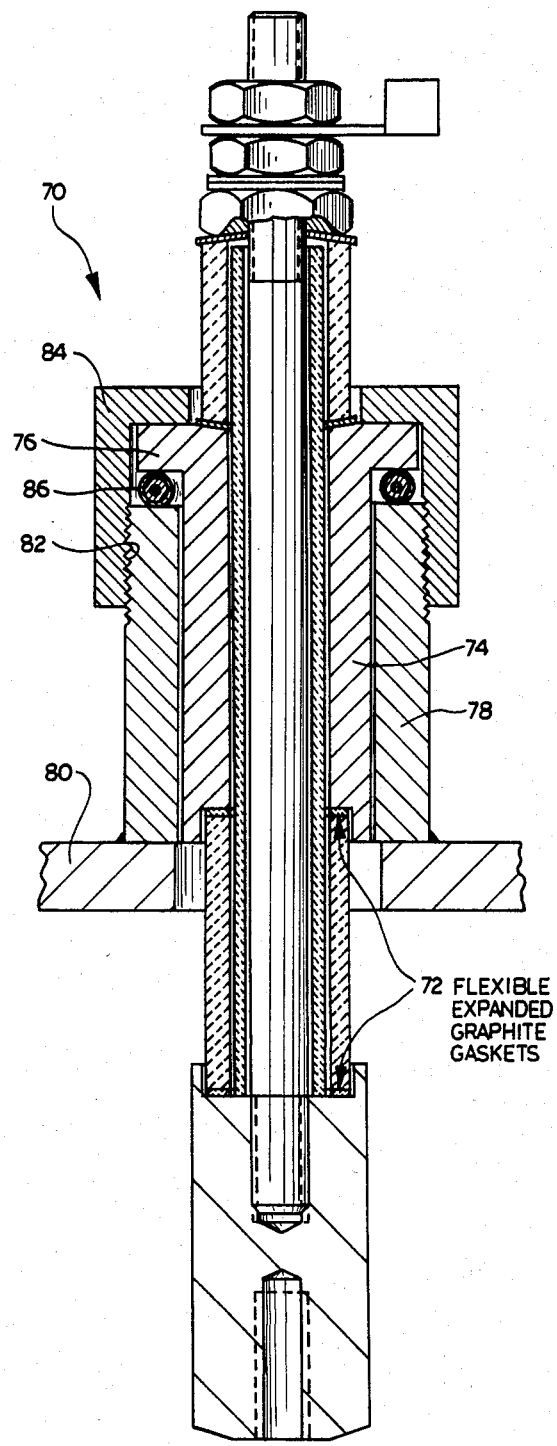
FIG. 2

HIGH PRESSURE ELECTRICAL CONDUCTIVITY PROBE

FIELD OF INVENTION

This invention relates to high pressure electrical conductivity probes and more particularly to an electrical conductivity probe to be used with pressure vessels such as steam boilers wherein parts of the probe within the pressure vessel are subjected to high temperatures and pressures.

BACKGROUND OF THE INVENTION

Electrical conductivity probes are used in a variety of applications to determine liquid levels in vessels and also to actuate fuel cutoff interlocks and alarms automatically, to energize solenoid valves, and to control pump motors at preset levels. Electrical conductivity probes are most frequently used to monitor liquid levels in boilers. Other conventional steam generating applications include installations on feed-water heaters, flash tanks, deaerators and turbine drains. The electrical conductivity probes must be able to withstand pressures up to about 3000 psi and temperatures up to about 700° F.

Electrical conductivity probes are used with liquids which have at least a slight degree of electrical conductivity, commonly found in most inorganic fluids, such as in steam boilers. Generally, a series of electrical conductivity probes are used along the wall of a pressure vessel or in an adjacent gauge tube. As the liquid in the vessel or gauge tube rises or falls, the fluid contacts one or more of the electrode connector tips in a series of probes. Where the electrical conductor of a probe is in contact only with a gas such as steam, a high resistance is encountered. When the electrical conductor of a probe is in contact with the conductive liquid, such as water, a relatively lower resistance is encountered. When the liquid is in contact with the electrode conductor of a probe and the wall of the pressure vessel or gauge tube, an electrical circuit is completed which, in turn, operates an alarm or some indicating device.

An essential feature of such electrical conductivity probes is an insulator which insulates a metal mounting body and the metal electrode connector. Zirconium oxide is currently used in most electrical conductivity probes of this type since it is one of the few materials that has been found effective for use in high pressure boilers. Aluminum oxide and glass have been found to be unsatisfactory at high temperatures and pressure.

A mechanical pressure type joint is necessary between the insulator and the metal mounting body and the electrode connector. The last three mentioned body parts of the electrical conductivity probe are held in compression by a central rod which is in tension. A feature of the mechanical sealing means between the foregoing body parts of the electrical conductivity probe is that at higher pressures the seals must be constructed to develop increasing sealing pressure.

In order to effect this sealing arrangement, certain electrical conductivity probes presently being marketed are made pursuant to U.S. Pat. No. 3,158,682. The sealing means employed therein is two relatively soft nickel gaskets which are brazed, respectively, to the metal mounting body and the electrode connector. As disclosed in the patent, a conical surface on the nickel gasket must be machined to correspond to another conical surface on the hollow insulator. Slightly different angles are used for the two conical surfaces so that a circumferential line contact is made between the insulator and the two soft nickel gaskets. Alternatively, in actual practice a rectangular gasket can be brazed and then deformed into a conical surface by pressure contact from the hollow insulator.

As can be appreciated from the foregoing description, which is disclosed in more detail in U.S. Pat. No. 3,158,682, machining and assembling involves several steps. First, machining a conical surface on the zirconium oxide insulator is difficult. Second, relatively soft nickel gaskets must be brazed to the metal body parts. Third, the conical surface must be machined on the soft nickel gaskets. Typically, two different angles are disclosed in the patent for the different nickel and insulating parts, such as 57° and 60°. It will be appreciated that such a slight angular difference in such small parts requires a high degree of accuracy. Even if the nickel gasket is not premachined to a conical surface, care must be taken to insure that the conical surface on the hollow insulator is used to accurately deform the nickel gasket to form a mating surface in the soft nickel gasket. In addition, assembly of the electrical conductivity probe of U.S. Pat. No. 3,158,682 requires special assembly steps. The main probe body parts must be aligned very accurately because of the conical surfaces on the seal structure. A special assembly jig is required to hold the parts from rotating while a torque nut on a center rod is tightened to place the main body parts in compression.

A further problem arises out of the use of the electrical conductivity probe of U.S. Pat. No. 3,158,682. If a leak is developed in the probe, the probe must be disassembled to ascertain the location of the leak. In disassembling the probe, the relatively soft nickel gaskets have a tendency to adhere to the insulator. Because of that adherence and because the nickel gaskets are brazed to the metal body parts, disassembly of the probe tends to result in breakage of the hollow insulator. That breakage compounds the ability to make field repairs on the electrical probe. In addition, field repairs are complicated because reassembly of the probe requires a special jig to prevent rotation of the main body parts.

SUMMARY OF THE INVENTION

The electrical conductivity probe of the present invention is designed to overcome the foregoing deficiencies of U.S. Pat. No. 3,158,682. In order to effect a mechanical seal between the insulator and the electrode connector and the metal mounting body, cylindrical recesses are provided in the electrode connector and the metal mounting body. The insulator is, preferably, a hollow, cylindrical sleeve member having flat annular end surfaces. The latter construction avoids the need to machine a conical surface on the insulator. The hollow insulator is located in the cylindrical recesses in the metal mounting body and in the electrode connector, and a portion of both ends of the cylindrical outer surface of the hollow insulator is sheathed within those recesses. The metal mounting body, the hollow insulator, and the electrode connector are placed in compression, usually by a central rod forming a portion of the electrical circuit.

Preferably, the mechanical high pressure joint is achieved by either a flexible, expanded graphite gasket in the cylindrical recesses or a mechanical interference fit between the hollow insulator and the metal mounting body and the electrode connector.

The structure of the electrical conductivity probe of the present invention achieves a good mechanical seal but avoids the need to machine any conical surfaces on the hollow insulator and avoids the need to use relatively soft nickel gaskets, including the necessary steps of brazing and subsequent machining or forming of the conical surfaces thereon.

In addition, one form of the electrical conductivity probe of the present invention is repairable since disassembly will not result in fracturing of the insulator. In the case of the flexible, expanded graphite gasket, relatively cheap replacement gaskets of the same material can be used for reassembly. Unlike the prior art structure with the nickel seals that adhered to and caused breakage of the hollow insulator, the graphite seals of the present invention do not have such adherence.

BRIEF DESCRIPTION OF THE DRAWINGS

With respect to the accompanying drawings:

FIG. 1 is a longitudinal sectional view of a preferred embodiment of the electrical probe constructed according to the present invention using a high temperature stable sealing gasket;

FIG. 2 is a longitudinal sectional view of a probe similar to that shown in FIG. 1 and designed for higher pressure applications;

DESCRIPTION OF PREFERRED EMBODIMENTS

Figure 3:
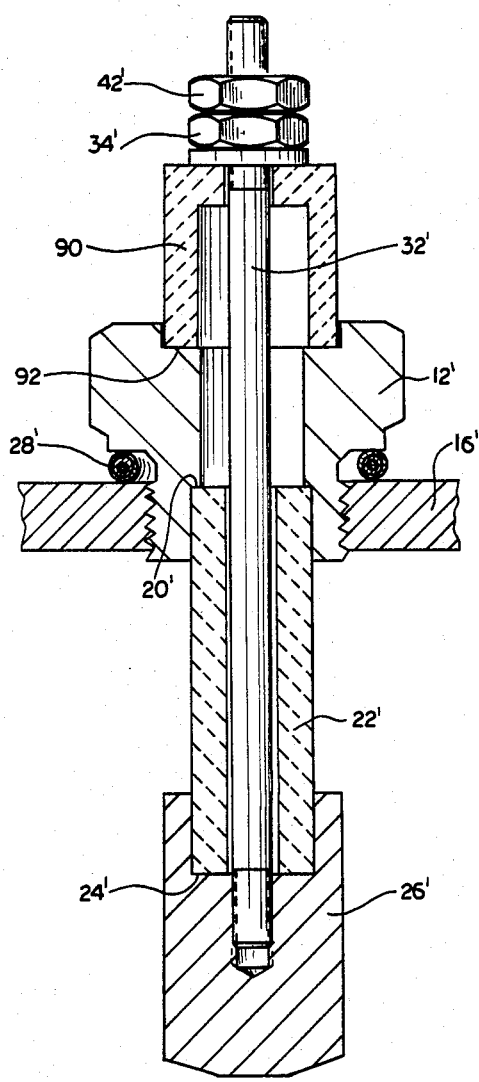
FIG. 3 is a longitudinal sectional view of another preferred embodiment of the electrical probe constructed according to the present invention using an interference fit sealing arrangement.

The electrical probe 10 in FIG. 1 has a metal mounting body 12 with a threaded portion 14 for threaded engagement with a pressure vessel or gauge wall 16 at a threaded portion 18. Adjacent the threaded portion 14 in the mounting body 12 is a cylindrical recess 20. Mounted within the cylindrical recess 20 in the mounting body 12 is an insulator 22. The insulator 22 is preferably a hollow, cylindrical structure having planar end surfaces generally perpendicular to the longitudinal axis of the insulator 22. Preferably, the insulator 22 is constructed of zirconium oxide. The other end of the insulator is mounted within a similar cylindrical recess 24 formed in one end of an electrode connector body or tip 26.

The mounting body 12 is sealed against the pressure vessel wall 16 by a suitable gasket 28. The gasket 28 must be suitable for sealing the mounting body 12 against the pressure vessel wall 16 up to very high pressures such as 3000 psi. This gasket may take several forms, but a suitable form is an asbestos filled gasket with a Monel metal wrapping or sheath which in turn is silver plated. The silver plating provides a ductile layer which forms a good high pressure seal.

The insulator 22 is sealed within the cylindrical recesses 20 and 24 of the metal mounting body 12 and the electrode connector 26, respectively, by sealing gaskets 30.

The electrode connector 26, the insulator 22, and the mounting body 12 are held in compression by a center rod 32. The center rod 32 is threadedly engaged at one end with a compression nut 34 and in a threaded recess 35 in the electrode connector 26 at the other end.

In addition, the mounting body 12, the insulator 22 and the electrode connector 26 are held in compression with the aid of Belleville washers 36 and a compression washer 38.

The electrical connection to accompanying control units and indicators is made through a wire terminal 40 which is held in place by a terminal nut 42 threaded to the center rod 32. The center rod 32 extends through an internal bore 44 in the insulator 22 and through an internal bore 46 in mounting body 12. Surrounding the center rod 32 within those internal bores is a sleeve or tubular insulator 48. Preferably, the sleeve or tubular insulator 48 is constructed of a ceramic material such as aluminum oxide.

An external, standoff insulator 50 is located between the mounting body 12 and compression washer 38. The central rod 32 located within the tubular insulator 48 extends through a bore 52 within the external standoff insulator 50. Between the external standoff insulator 50 and the compression washer 38 is located an upper cushion washer 54, and between the external standoff insulator 50 and the mounting body 12 is located a lower cushion washer 56.

Because of the high pressures and temperatures to which the probe is exposed, the electrode connector 26, the mounting body 12, the compression washer 38, the Belleville washers 36, the compression nut 34, and the terminal nut 42 are preferably constructed of type 416 stainless steel. The insulator 22 is preferably constructed of zirconium oxide, while the tubular insulator 48 and the external standoff insulator 50 are constructed of aluminum oxide. Zirconium oxide is preferred for the insulator 22 because other insulators, such as glass and aluminum oxide, have been found unsatisfactory if exposed to high temperatures and pressures. The upper and lower cushion washers 54, 56 are preferably constructed of copper.

The seal to be formed between the insulator 22 and the electrode connector 26, on one end, and mounting body 12, on the other end, is critical to the operation of the electrical probe 10. The electrical probe 10 of the present invention operates to indicate the level of a conductive fluid by completing an electrical circuit. The liquid whose level is being sensed by the probe 10 must have a slight degree of electrical conductivity, commonly found among inorganic fluids such as water. The liquid level indicator 10 is frequently used to monitor the level of fluid in boilers. Other conventional steam generating applications include installation on feedwater heaters, flash tanks, deaerators and turbine drains. The probe 10 can also be used to actuate fuel cutoff interlocks and alarms automatically, energize solenoid valves or control pump motors at preset levels. For example, as a liquid level rises and falls, the liquid comes in contact between the electrode connector 26 and the pressure vessel wall 16. The pressure vessel wall 16 can be the main pressure vessel or an accompanying gauge tube. As the liquid level contacts the pressure vessel wall 16 and the electrode connector 26, an electrical circuit is completed. This circuit is completed from the electrode connector 26 through the conductive fluid to the pressure vessel wall 16, which forms part of the circuit as a ground. Electrode connector 26 is electrically connected to a control unit and indicators, not shown, through the central rod 32 and wiring terminal 40. A series of spaced probes—usually vertically— can be used to indicate a liquid level by virtue of which probes are in contact with the liquid and which are not.

The seals between the insulator 22 and the electrode connector 26 and the mounting body 12 are of critical importance to the present invention. The annular gaskets 30 are located in respective recesses in the mounting body 12 and the electrode connector 26. The mounting body 12, the insulator 22 and the electrode connector 26 are loaded in compression by the central rod 32 and the compression nut 34. As the pressure within the vessel exposed to the electrical probe 10 increases, the foregoing parts are placed in greater compression while the tension in the central rod 32 is lessened. The high temperatures and pressures to which the probe is exposed are important factors in considering the design of the seal. For example, as suggested in U.S. Pat. 3,158,682 a planar soft metal gasket could not be used in a structure of the type shown in FIG. 3 of that patent or FIG. 1 of the present invention because of expansion. A planar, annular sealing gasket made out of metal would expand radially and impose a radial force upon the insulator 22. This radial force is caused by the difference in expansion rates between metal and ceramic materials. This would place the insulator 22 under dangerous tension.

The present invention as illustrated in FIG. 1 depicts a sealing structure which is not only much simpler to manufacture and assemble than the prior art structure, but also takes into account the foregoing compression and expansion problems. The sealing gaskets 30 of the present invention are made of a material which can withstand the high temperatures and pressures to which the probe is exposed without degradation or destruction and without any significant thermal expansion. Preferably, the gasket according to this first embodiment of the present invention is made of a flexible expanded graphite material. The sealing gaskets 30 can be die cut from laminated sheets formed from such flexible expanded graphite materials and may include wire reinforcement materials for added strength in handling during manufacturing and assembling.

Flexible expanded graphite sheets can be prepared, as is well known, by expanding graphite flakes many times and then compressing the expanded flakes to form a cohesive structure. The expansion of graphite flakes can be readily achieved by attacking the bonding forces between the layers of the internal structure of graphite, such as by the use of an acid. The result of such an attack is that the spacing between the superimposed layers can be increased so as to effect a marked expansion in the crystalline structure. The expanded particles can be formed under pressure into a foam material since the particles have the ability to adhere without a binder due to the large expansion. Sheets and the like are formed from the expanded graphite particles by simply increasing the compressive pressure, the density of the formed graphite being related to the applied formation pressure. A more complete description of the method of forming such flexible expanded graphite sheets can be found in U.S. Pat. No. 3,404,061, issued Oct. 1, 1968. Typically, such flexible expanded graphite sheets have a density in the range of about 10 pounds per cubic foot to about 100 pounds per cubic foot, preferably from about 50 pounds per cubic foot to about 90 pounds per cubic foot and a thickness from about 0.003 inch to about 0.060 inch, preferably from about 0.005 to about 0.025 inch. One such material available on the market is "Grafoil" from Union Carbide Corporation.

FIG. 2 shows a probe 70 similar to the probe 10 in FIG. 1 using the flexible expanded graphite seals 72. The electrical probe 70 is modified to withstand even higher pressures than those for FIG. 1. The electrical probe 70 includes a metal body 74 having a flanged head 76. An adapter sleeve 78 is welded to a pressure vessel wall 80 and has a threaded upper end 82. A coupling nut 84 threadedly engages the threads 82 on adapter sleeve 78 and engages the flanged head 76 and forces it against a gasket 86 between the flanged head 76 and the adapter sleeve 78. The probe 70 in FIG. 2 has the advantage over the construction shown in FIG. 1 in not exposing any threads to steam or other liquid when the probe is mounted within the pressure vessel. Thus, the possibility of the mounting threads being frozen or corroded in place in the vessel is reduced.

The electrical probe 10' of FIG. 3 is somewhat similar to that depicted in FIG. 1 with like parts being designated by the same number in prime. The major difference between the two structures is that the electrical probe 10' of FIG. 3 eliminates the need for any additional sealing arrangement between the mounting body 12', the insulator 22', and the electrode connector 26'. The insulator 22' forms a seal directly with the mounting body 12' and the electrode connector 26' by means of an interference fit. The ceramic insulator 22' is mechanically pressed into an interference fit into the cylindrical recess 20' in mounting body 12' and into another recess 24' in electrode connector 26'. Although the mounting body 12' and electrode connector 26' thermally expand at a greater rate than the insulator 22', the interference fit is such that sufficient holding power between the parts is still maintained at the maximum temperature. Preferably, the outside diameter of the insulator 22' is about 0.001 inch greater than the inside diameters of the recesses 20' and 24' in the mounting body 12' and the electrode connector 26', respectively.

The standoff external insulator 90 in FIG. 3 has a closed end with an aperture for central rod 32' and is held with respect to the mounting body 12' in a recess 92. The electrical probe of FIG. 3 can be constructed without any tubular or sleeve insulator 48. Eliminating the sleeve insulator 48 in turn permits the construction of a smaller diameter probe.

Figure 4:
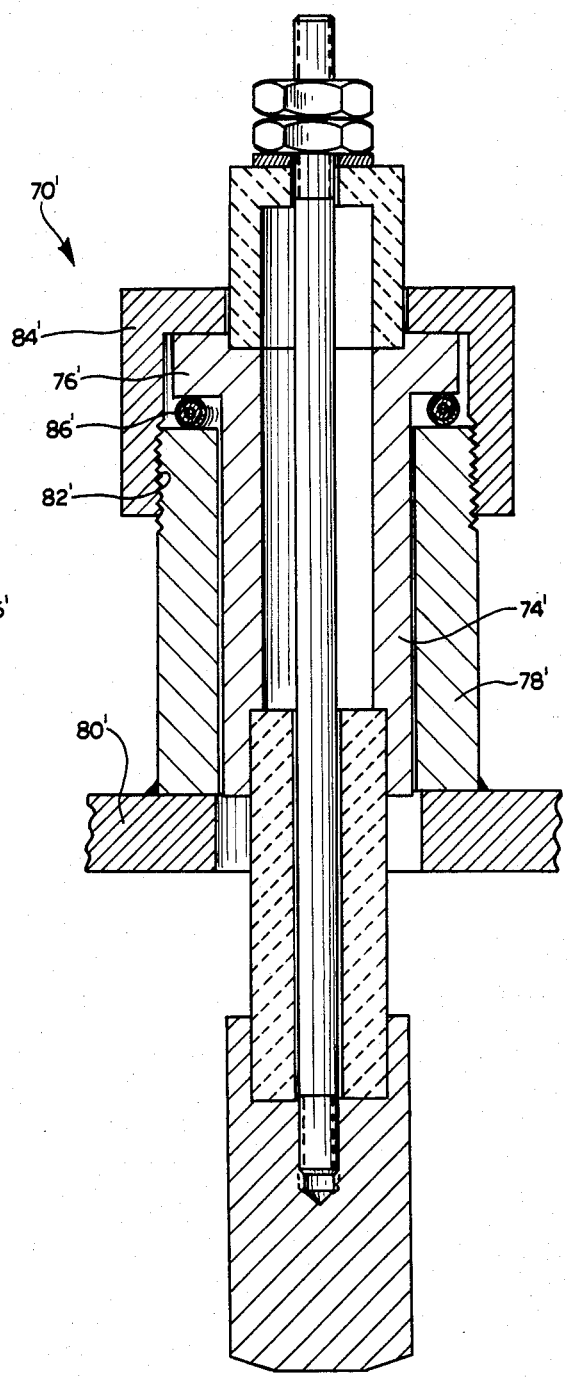
FIG. 4 is a longitudinal sectional view of another preferred embodiment of the present invention similar to that shown in FIG. 3 and designed for higher pressure applications.

FIG. 4 shows a probe 70' similar to the probe 10' in FIG. 3. The electrical probe 70' is modified to withstand even higher pressures than those for FIG. 3. The electrical probe 70' includes a metal body 74' having a flanged head 76'. An adapter sleeve 78' is welded to a pressure vessel wall 80' and has a threaded upper end 82'. A coupling nut 84' threadedly engages the threads 82' on adapter sleeve 78' and engages the flanged head 76' and forces it against a gasket 86' between the flanged head 76' and the adapter sleeve 78'. The probe 70' in FIG. 4 has the advantage over the construction shown in FIG. 3 in not exposing any threads to steam or other liquid when the probe is mounted within the pressure vessel. Thus, the possibility of the mounting threads being frozen or corroded in place in the vessel is reduced.

The electrical probe of the present invention has several advantages over prior art electrical probes. In order to make a proper seal in the prior art probe that is depicted in U.S. Pat. No. 3,158,682, the insulator 13 as shown in FIGS. 1 and 2 thereof had to be formed with a conical surface at either end. Forming the conical surface on the ceramic material is difficult and relatively expensive compared to the present insulators which can be formed with planar ends having surfaces that lie in parallel planes perpendicular to the longitudinal axis of the cylindrical insulator. Another advantage is that one form of the probe of the present invention is more easily repairable. In the prior art probe as shown in U.S. Pat. No. 3,158,682, removal of the electrode connector from the ceramic body frequently resulted in a fracturing of the ceramic body 13. This fracturing resulted because of the fact that the soft nickel gaskets were brazed to the mounting body and the electrode connector. Since the brazed gaskets were relatively soft nickel, the nickel had a tendency to stick to the ceramic insulator. In dismantling the probe, the cohesiveness between the nickel gaskets and the ceramic body at opposite ends frequently caused breakage of the insulator. Reassembly also requires a special jig which complicates field repairs. With respect to the probe of FIGS. 1 and 2 of the present invention, removal of the electrode connector 26 does not result in breakage of the insulator 22. Only the expanded graphite seals 30 and 72 need be replaced in order to make the probe easily repairable.

A further advantage of the present invention is that the electrical probes made in accordance herewith are simpler to manufacture and cheaper to construct. As noted in U.S. Pat. No. 3,158,682, the metal gaskets 35 first had to be brazed to the mounting body and the electrode connector. A conical surface then had to be machined or formed on each metal gasket to match a corresponding conical shape on the insulator. It was important during assembly to carefully align the various parts and to torque the compression nut without turning the various body parts of the probe. In contrast, the electrical probe of the present invention is simpler to manufacture and cheaper to construct. For example, the welding and subsequent machining steps are eliminated, as is the formation of the conical angles of U.S. Pat. 3,158,682. Assembly is also simpler since the alignment problem is greatly simplified.

What is claimed is:

1. An electrical conductivity probe designed to withstand high pressures comprising
   a conductive electrode connector,
   a first cylindrical recess in one end of said electrode connector having a planar, annular surface, said first cylindrical recess having a diameter less than the diameter of said electrode connector creating a first annular projection integral with and forming a unitary part of said electrode connector,
   a metal mounting body having a bore therethrough along the longitudinal axis of said metal mounting body,
   means for mounting said metal mounting body to a pressure vessel,
   a second cylindrical recess in one end of said metal mounting body having a planar, annular surface, said second cylindrical recess having a diameter substantially equal to said first cylindrical recess and having a diameter less than the diameter of said metal mounting body creating a second annular projection integral with and forming a unitary part of said metal mounting body,
   a hollow insulator capable of withstanding high temperatures and pressures up to about 3000 psi, said hollow insulator being mounted to electrically insulate and to separate said metal mounting body and said electrode connector,
   said hollow insulator having a cylindrical outer surface along the length thereof, an internal bore along the longitudinal axis thereof and annular surfaces at each end thereof, said annular surfaces lying in substantially parallel planes which are perpendicular to the longitudinal axis of the hollow insulator and which surfaces intersect the cylindrical outer surface,
   each of said annular surfaces being located in one of said cylindrical recesses in said metal mounting body and said electrode connector,
   a portion of the cylindrical outer surface of said hollow insulator at each end thereof being sheathed within the respective cylindrical recesses and the respective annular projections in said metal mounting body and said electrode connector,
   means for sealing said hollow insulator in said cylindrical recesses of said electrode connector and said metal mounting body,
   said means for sealing comprising means for forming a mechanical high pressure joint between said hollow insulator and said respective cylindrical recesses in said metal mounting body and said electrode connector by sealing surface means on said electrode connector and said metal mounting body for forming a compression seal with said hollow insulator to create compression in said hollow insulator between said hollow insulator and said respective cylindrical recesses in said metal mounting body and said electrode connector,
   an external terminal, and
   means for providing an electrical connection between said electrode connector and said external terminal adapted to complete an electrical circuit when a conductive liquid comes into contact with said electrode connector and a wall of a pressure vessel to which the probe is adapted to be mounted.

2. An electrical conductivity probe as claimed in claim 1 wherein the means for sealing comprises flexible expanded graphite gaskets located in said cylindrical recesses in said metal mounting body and said electrode connector in adjacent, sealing contact with said annular surfaces of said hollow insulator to form a high pressure tight joint between said hollow insulator and said electrode connector and said metal mounting body.

3. An electrical conductivity probe as claimed in claim 1 wherein said means for sealing comprises an interference fit between said hollow insulator and said cylindrical recesses in said metal mounting body and said electrode connector, said hollow insulator having an outside diameter greater than the diameters of said cylindrical recesses prior to insertion of the hollow insulator therein to create the interference fit.

4. An electrical conductivity probe as claimed in claims 2 or 3 wherein said hollow insulator is placed in compression by said means for providing an electrical connection which comprises a central rod engaging a central portion of said electrode connector and extending through said internal bores in said hollow insulator and said metal mounting body, and tension means for applying tension to said center rod relative to said metal mounting body, said hollow insulator and said electrode connector to place the latter components in compression.

5. An electrical conductivity probe as claimed in claim 4 further comprising an external standoff insulator having an internal bore in which a portion of said central rod is located, said external standoff insulator being positioned between said metal mounting body and said tension means.

6. An electrical conductivity probe as claimed in any one of claims 1, 2 and 3 wherein said hollow insulator comprises zirconium oxide.

7. An electrical conductivity probe designed to withstand high pressures comprising
a conductive electrode connector,
a metal mounting body,
means for conductively mounting said metal mounting body to a pressure vessel,
an external terminal,
means providing an electrical connection between said electrode connector and said external terminal adapted to complete an electrical circuit when a conductive liquid comes into contact with said electrode connector and a wall of a pressure vessel to which the probe is adapted to be mounted through electrical, conductive contact with said metal mounting body,
means to electrically insulate said metal mounting body and said electrode connector to prevent the former from short circuiting the electrical circuit when the electrode connector comes into contact with a conductive liquid,
said means to insulate being an insulator capable of withstanding high temperatures and pressures up to about 3000 psi,
said insulator having a cylindrical outer surface along the length thereof and planar surfaces at each end thereof, said planar end surfaces lying in substantially parallel planes which are perpendicular to the longitudinal axis of the insulator and which surfaces intersect the cylindrical outer surface,
a first cylindrical recess in one end of said electrode connector having a planar surface, said first cylindrical recess having a diameter less than the diameter of said electrode connector creating a first annular projection integral with and forming a unitary part of said electrode connector,
a second cylindrical recess in one end of said metal mounting body having a planar surface, said second cylindrical recess having a diameter substantially equal to said first cylindrical recess and having a diameter less than the diameter of said metal mounting body creating a second annular projection integral with and forming a unitary part of said metal mounting body,
each of said planar end surfaces and an adjacent portion of the cylindrical outer surface of said insulator being located in one of said cylindrical recesses in said metal mounting body and said electrode connector,
means for forming a seal in the cylindrical recesses with said planar end surfaces of said insulator, and
said means for forming a seal comprising means for forming a mechanical high pressure joint between said insulator and said respective cylindrical recesses in said metal mounting body and said electrode connector by sealing surface means on said electrode connector and said metal mounting body for forming a compression seal with said insulator to create compression in said insulator between said insulator and said respective cylindrical recesses in said metal mounting body and said electrode connector.

8. An electrical conductivity probe as claimed in claim 7 wherein the means for forming a seal comprises flexible expanded graphite gaskets located in said cylindrical recesses in said metal mounting body and said electrode connector in adjacent, sealing contact with said planar end surfaces of said insulator to form a high pressure tight joint between said insulator and said electrode connector and said metal mounting body.

9. An electrical conductivity probe as claimed in claim 7 wherein said means for forming a seal comprises an interference fit between said insulator and said cylindrical recesses in said metal mounting body and said electrode connector, said insulator having an outside diameter greater than the diameters of said cylindrical recesses prior to insertion of the insulator therein to create the interference fit.

10. An electrical conductivity probe as claimed in claims 8 or 9 wherein said insulator is placed in compression by said means for providing an electrical connection which comprises a central rod engaging a central portion of said electrode connector and extending through internal bores in said insulator and said metal mounting body, and tension means for applying tension to said center rod relative to said metal mounting body, said insulator, and said electrode connector to place the latter components in compression.

11. An electrical conductivity probe as claimed in claim 10 further comprising an external standoff insulator having an internal bore in which a portion of said central rod is located, said external standoff insulator being positioned between said metal mounting body and said tension means.

12. An electrical conductivity probe as claimed in any one of claims 7–9 wherein said insulator comprises zirconium oxide.

* * * * *